United States Patent
Pepus et al.

(10) Patent No.: US 10,713,077 B2
(45) Date of Patent: Jul. 14, 2020

(54) MULTIPLE SINGLE LEVELS OF SECURITY (MSLS) IN A MULTI-TENANT CLOUD

(71) Applicant: Semper Fortis Solutions, LLC, Leesburg, VA (US)

(72) Inventors: Gregory B. Pepus, Silver Spring, MD (US); Todd O'Connell, Fairfax, VA (US)

(73) Assignee: Semper Fortis Solutions, LLC, Leesburg, VA (US)

( * ) Notice: Subject to any disclaimer, the term of this patent is extended or adjusted under 35 U.S.C. 154(b) by 136 days.

(21) Appl. No.: 15/880,794

(22) Filed: Jan. 26, 2018

(65) Prior Publication Data

US 2018/0210751 A1    Jul. 26, 2018

Related U.S. Application Data

(60) Provisional application No. 62/450,984, filed on Jan. 26, 2017.

(51) Int. Cl.
*G06F 9/455*    (2018.01)
*H04L 29/08*    (2006.01)
(Continued)

(52) U.S. Cl.
CPC .......... *G06F 9/45558* (2013.01); *H04L 9/083* (2013.01); *H04L 63/0209* (2013.01);
(Continued)

(58) Field of Classification Search
CPC ....... G06F 9/45558; G06F 2009/45587; H04L 63/0209; H04L 63/062; H04L 63/06; H04L 9/083; H04L 67/10; H04L 63/08
See application file for complete search history.

(56) References Cited

U.S. PATENT DOCUMENTS 7,607,167 B1 * 10/2009 Johnson .................. H04L 45/56
709/201
7,835,523 B1 * 11/2010 Mickelson ............... H04K 1/00
380/255
(Continued)

FOREIGN PATENT DOCUMENTS

EP       2 055 064 B1    2/2013
EP       2 995 038 A4    11/2016
(Continued)

OTHER PUBLICATIONS

International Search Report and Written Opinion dated May 16, 2018, from application No. PCT/US2018/015494.
(Continued)

*Primary Examiner* — Abu Zar Ghaffari
(74) *Attorney, Agent, or Firm* — Foley & Lardner LLP

(57) ABSTRACT

Apparatus and methods are described herein for multiple single level security (MSLS) domains including, but not limited to, a secure kernel hypervisor (SKH). The SKH configures a single multi-tenant cloud to host the MSLS domains. A cloud orchestration system (COS) configures the single multi-tenant cloud to set up a plurality of separate virtual work packages (VWPs) for the MSLS domains. A key management system (KMS) is configured to manage security objects associated with the MSLS domains.

19 Claims, 8 Drawing Sheets

(51) Int. Cl.
 *H04L 9/08* (2006.01)
 *H04L 29/06* (2006.01)
(52) U.S. Cl.
 CPC ............ *H04L 63/06* (2013.01); *H04L 63/062* (2013.01); *G06F 2009/45587* (2013.01); *H04L 67/10* (2013.01)

(56) References Cited

U.S. PATENT DOCUMENTS

| | | | |
|---|---|---|---|
| 8,555,377 B2* | 10/2013 | Pate | G06F 21/53 |
| | | | 717/174 |
| 9,300,640 B2* | 3/2016 | Pate | G06F 21/53 |
| 9,369,490 B2 | 6/2016 | Fouladgar et al. | |
| 9,659,192 B1* | 5/2017 | Wanasek | G06F 21/81 |
| 9,716,728 B1 | 7/2017 | Tumulak | |
| 9,729,577 B2 | 8/2017 | White et al. | |
| 9,967,289 B2 | 5/2018 | White et al. | |
| 10,095,527 B2* | 10/2018 | Oh | G06F 9/4406 |
| 10,257,175 B2 | 4/2019 | Thunuguntla et al. | |
| 10,257,230 B2 | 4/2019 | White et al. | |
| 10,348,485 B2 | 7/2019 | Stueve et al. | |
| 10,412,116 B1* | 9/2019 | Powers | G06F 9/546 |
| 10,523,645 B2 | 12/2019 | Zhu et al. | |
| 10,547,598 B2 | 1/2020 | Cates et al. | |
| 2010/0011412 A1 | 1/2010 | Maximilien et al. | |
| 2013/0139159 A1* | 5/2013 | Eidus | G06F 9/45545 |
| | | | 718/1 |
| 2013/0298183 A1* | 11/2013 | McGrath | G06F 9/455 |
| | | | 726/1 |
| 2014/0075501 A1* | 3/2014 | Srinivasan | G06F 21/62 |
| | | | 726/1 |
| 2014/0283010 A1* | 9/2014 | Rutkowski | G06F 21/31 |
| | | | 726/18 |
| 2014/0331309 A1* | 11/2014 | Spiers | H04L 63/0218 |
| | | | 726/12 |
| 2015/0012977 A1 | 1/2015 | Huh et al. | |
| 2015/0101012 A1 | 4/2015 | White et al. | |
| 2016/0070929 A1* | 3/2016 | Potlapally | G06F 21/64 |
| | | | 726/26 |
| 2016/0269179 A1 | 9/2016 | White et al. | |
| 2016/0269364 A1 | 9/2016 | White et al. | |
| 2016/0269370 A1 | 9/2016 | White et al. | |
| 2016/0269373 A1 | 9/2016 | White et al. | |
| 2017/0093819 A1 | 3/2017 | Thunuguntla et al. | |
| 2017/0200005 A1* | 7/2017 | Mooring | G06F 9/45558 |
| 2017/0250811 A1 | 8/2017 | Edwards | |
| 2017/0250964 A1 | 8/2017 | Edwards et al. | |
| 2017/0250966 A1 | 8/2017 | White et al. | |
| 2017/0251022 A1 | 8/2017 | White et al. | |
| 2017/0251023 A1 | 8/2017 | Edwards et al. | |
| 2017/0324780 A1 | 11/2017 | White et al. | |
| 2018/0260255 A1* | 9/2018 | Yazdani | G06F 9/52 |

FOREIGN PATENT DOCUMENTS

| | | |
|---|---|---|
| FR | 2922392 B1 | 4/2009 |
| GB | 2 472 491 B | 9/2013 |
| WO | WO-2018/075912 A1 | 4/2018 |
| WO | WO-2019/129842 A1 | 7/2019 |

OTHER PUBLICATIONS

International Preliminary Report on Patentability dated Aug. 8, 2019, from application No. PCT/US2018/015494.

* cited by examiner

TYPE 2

TYPE 1

MULTIPLE SINGLE LEVELS OF SECURITY (MSLS) IN A MULTI-TENANT CLOUD

CROSS-REFERENCE TO RELATED PATENT APPLICATION

This application claims priority from Provisional U.S. Application Ser. No. 62/450,984, filed on Jan. 26, 2017, which is incorporated herein by reference in its entirety.

BACKGROUND

A single hardware platform may physically host only a single operating system (OS) and a local set of applications. With the virtualization of processors, a single hardware platform can be sub-divided to provide virtual machines (VMs). Each VM can be configured to appear as a stand-alone computer. Each VM can run a set of applications within limits of computing, storage, and networking resources made available by the single hardware platform supporting the VMs.

Typically, security for these VMs is limited to the security available to the OS and network used by a target virtualization system. This means that even with all the best security measures found in an OS, significant vulnerabilities still exist.

Traditional OSes have millions of lines of code, thousands of application programming interfaces (APIs), and thousands of interrupts and input/output ports. These attributes present multiple attack surfaces for cyber attackers, intruders, malware, worms and viruses. Consequently, secure systems built atop of these OSes always face multiple avenues of attack and threat.

SUMMARY

In some examples, a security system for multiple single level security (MSLS) domains includes a secure kernel hypervisor (SKH). The SKH configures a single multi-tenant cloud to host the MSLS domains. The security system further includes a cloud orchestration system (COS). The COS configures the single multi-tenant cloud to set up a plurality of separate virtual work packages (VWPs) for the MSLS domains. The security system includes a key management system (KMS). The KMS is configured to manage security objects associated with the MSLS domains.

In some examples, the SKH includes a separation kernel and a hypervisor.

In some examples, the separation kernel is a kernel that has no API, no interrupts, and no input/output ports.

In some examples, the separation kernel is configured at installation without capabilities to change installed configurations after installation.

In some examples, the hypervisor configures the single multi-tenant cloud to host the MSLS domains by virtualizing the hardware of the single multi-tenant cloud to execute a plurality of different OSes or applications, where each of the plurality of different OSes or applications corresponds to one of the MSLS domains.

In some examples, the COS dynamically allocates or de-allocates resources for the MSLS domains. The resources include one or more of processing resources, network resources, storage resources, peripherals of the single multi-tenant cloud.

In some examples, the COS assigns VWP slots.

In some examples, each of the VWP slots supports one or more virtual machines or specialty applications.

In some examples, the KMS manages the security objects associated with the MSLS domains by determining the security objects in response to a VWP being created.

In some examples, the COS is further configured to destroy a VWP by revoking resources assigned to the VWP and security objects associated with the VWP.

In some examples, the KMS encrypts each intra-domain network traffic with a unique security object.

In various examples, a method includes configuring a single multi-tenant cloud to host MSLS domains, configuring the single multi-tenant cloud to set up a plurality of separate VWPs for the MSLS domains, and managing security objects associated with the MSLS domains In some examples, configuring the single multi-tenant cloud to set up the plurality of separate VWPs for the MSLS domains includes dynamically allocating or de-allocating resources for the MSLS domains. The resources include one or more of processing resources, network resources, storage resources, peripherals of the single multi-tenant cloud.

In some examples, configuring the single multi-tenant cloud to set up the plurality of separate VWPs for the MSLS domains includes assigning VWP slots.

In some examples, each of the VWP slots supports one or more virtual machines or specialty applications.

In some examples, managing the security objects associated with the MSLS domains includes determining the security objects in response to a VWP being created.

In some examples, configuring the single multi-tenant cloud to set up the plurality of separate VWPs for the MSLS domains includes destroying a VWP by revoking resources assigned to the VWP and security objects associated with the VWP.

In some examples, managing security objects associated with the MSLS domains includes encrypting each intra-domain network traffic with a unique security object.

According to various examples, a security system for MSLS domains includes means for configuring a single multi-tenant cloud to host the MSLS domains, means for configuring the single multi-tenant cloud to set up a plurality of separate VWPs for the MSLS domains, and means for configuring configured to manage security objects associated with the MSLS domains.

In various examples, a non-transitory processor-readable medium includes processor-readable instructions such that, when executed, causes one or more processors to configure a single multi-tenant cloud to host MSLS domains by configuring the single multi-tenant cloud to set up a plurality of separate VWPs for the MSLS domains and managing security objects associated with the MSLS domains.

BRIEF DESCRIPTION OF THE DRAWINGS

The accompanying drawings, which are incorporated herein and constitute part of this specification, illustrate exemplary embodiments of the disclosure, and together with the general description given above and the detailed description given below, serve to explain the features of the various embodiments.

DETAILED DESCRIPTION

Various examples will be described in detail with reference to the accompanying drawings. Wherever possible, the same reference numbers may be used throughout the drawings to refer to the same or like parts. Different reference numbers may be used to refer to different, same, or similar parts. References made to particular examples and implementations are for illustrative purposes, and are not intended to limit the scope of the disclosure or the claims.

Examples presented herein relate to a software application methods and apparatuses based on implementations of a SKH, a KMS and a COS. In some implementations, the SKH can run on a stack to allow a cloud orchestration system to enable the MSLS described herein. This enables multiple domains in a multi-tenant cloud environment without risk of information leakage between separated VMs with separated virtual networks running in separate single level domains.

Implementations may include but are not limited to applications in government cloud systems to allow different security domains within a single stack of hardware such as unclassified, secret, top-secret and variations therein to operate safely and securely with in a multi-tenant cloud. Uses may also include protecting medical and healthcare environments in which some information must be protected in a Health Insurance Portability and Accountability Act (HIPAA) compliant domain within the cloud system while other information is kept in a more accessible but still properly protected domain within the cloud system. Other uses could include protection of legal information, trade secret, internet of things (IoT) devices and more. The technical solutions described herein allow provision of concrete separation in a cloud environment among separate domains of information.

Figure 1:
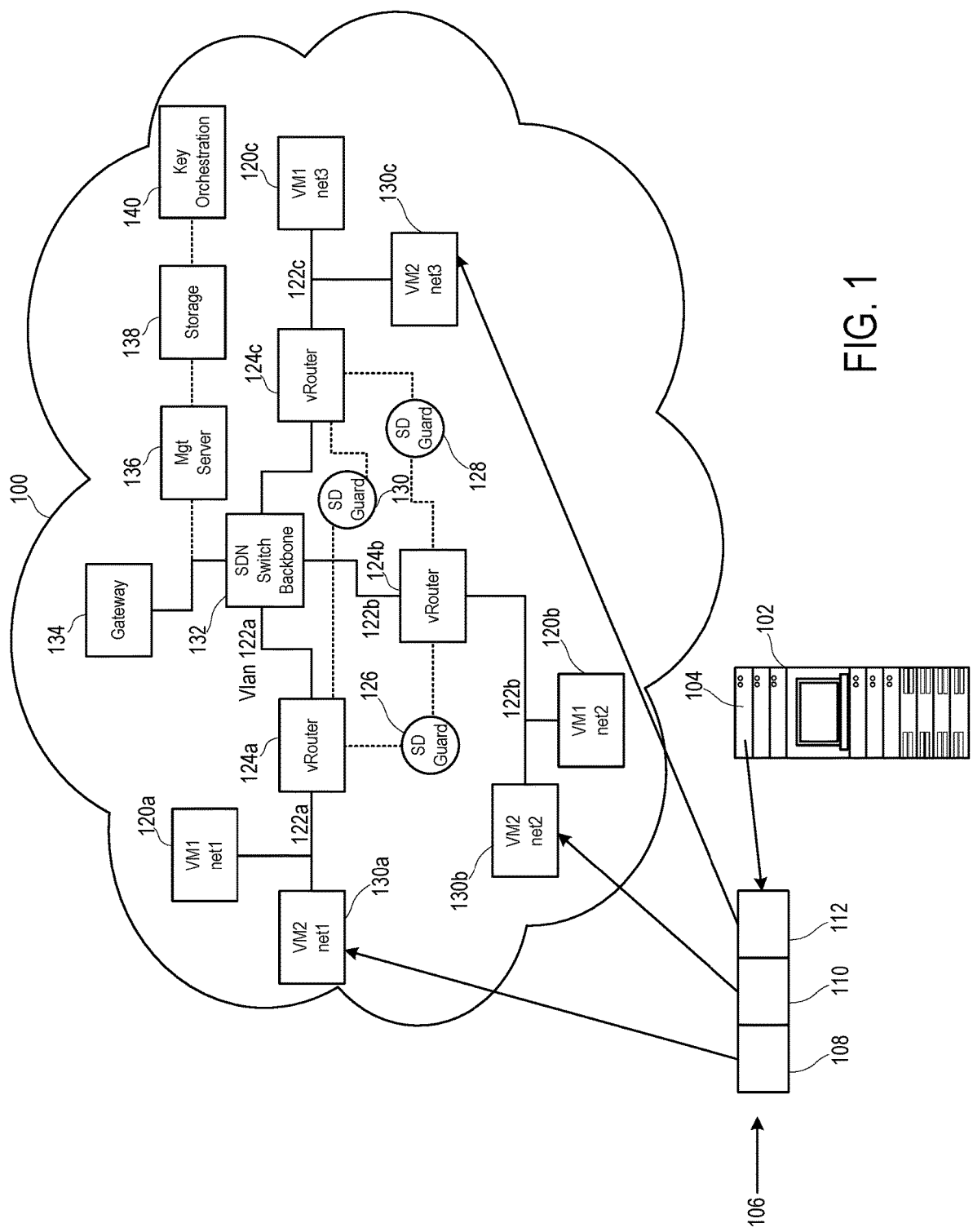
FIG. 1 is a diagram illustrating a MSLS on a single stack of hardware according to some examples.

FIG. 1 is a diagram illustrating an example of a MSLS on a single stack of hardware. FIG. 1 shows a cloud environment 100 corresponding to the MSLS. The cloud environment use computers, storage, and networking capabilities associated with a datacenter rack 102 to support VMs (e.g., at least VMs 130a-130c). Although traditionally, running separate domains requires separate computer hardware, network, and storage stacks for each domain, the MSLS corresponds to a software approach to allow a single stack of hardware (e.g., the datacenter rack 102) to run the MSLS using multiple independent levels of safety and security (MILS). The MILS can be configured based on a separation kernel. A separation kernel is a specialty OS using a real-time kernel, very few lines of code, limited or no APIs, limited or no I/O addresses other than memory addresses, and no ability to be changed post installation. In some implementations, the separation kernel also operates as a hypervisor for providing the VMs. As such, the combination of the separation kernel and the hypervisor can be referred to herein as a separation kernel hypervisor.

The data center rack 102 is shown to include multiple levels, one of which is a level 106, which is supported by a rack level 104 of the datacenter rack 102. The rack level 104 refers to hardware such as CPU, GPU, and the like that provides high processing power. The level 106 supports multiple MILS partitions 108, 110, and 112 enabled by a separation kernel. The datacenter rack 102 includes slots that correspond to the partitions 108-112. As shown, the partition 108 enables and manages encryption for the VM 130a. The partition 110 enables and manages encryption for the VM 130b. The partition 112 enables and manages encryption for the VM 130c.

In some implementations, the cloud environment 100 includes VMs connected to virtual routers (vRouters) via virtual local area networks (vLANs). The vRouters can virtually route IP traffic. For instance, the VMs 120a and 130a are connected via vLAN 122a to vRouter 124a. The encryption for the communications between the VMs 120a and 130a via the vLAN 122a can be managed by the partition 108. In other words, the partition 108 can manage encryption for the VMs 120a and 130a and the vRouter 124a. As further shown, the VMs 120b and 130b are connected via vLAN 122b to vRouter 124b. The encryption for the communications between the VMs 120b and 130b via the vLAN 122b can be managed by the partition 110. In other words, the partition 110 can manage encryption for the VMs 120b and 130b and the vRouter 124b. The VMs 120c and 130c are connected via vLAN 122c to vRouter 124c. The encryption for the communications between the VMs 120c and 130c via the vLAN 122c can be managed by the partition 112. In other words, the partition 112 can manage encryption for the VMs 120c and 130c and the vRouter 124c.

As shown two vRouters may be connected for exchanging data originating from the VMs 120a-120c and 130a-130c. For instance, vRouter 124a and 124b can be connected via a software defined (SD) guard 126, which has knowledge of encryption details provided by both the partitions 108 and 110. The SD guards can redirect potentially malicious traffic and adjust traffic flow and timeouts. Similarly, vRouter 124b and 124c can be connected via a SD guard 128, which has knowledge of encryption details provided by both the partitions 110 and 112. In addition, vRouter 124a and 124c can be connected via a SD guard 130, which has knowledge of encryption details provided by both the partitions 108 and 112.

The vRouters 124a-124c can be operatively coupled to a SD network (SDN) switch backbone 132 for exchanging data originating from the VMs. The SND switch backbone 132 is operatively coupled to a gateway 134 for routing IP traffic between the cloud environment 100 and other networks, such as a public network or a wide area network (WAN).

The connection between the gateway 134 and the SND switch backbone 132 can be monitored by a management server 136, a storage database 138, and a key orchestration server 140. In some arrangements, the management server 136 corresponds to a COS shown in FIG. 8. The storage database 138 corresponds to a storage database 850 shown in FIG. 8. The management server 136 corresponds to a security policy manager 840 shown in FIG. 8.

The present disclosure leverages a MILS approach, which uses a separation kernel plus a hypervisor (collectively referred to herein as a separation kernel hypervisor) to allow a single multi-tenant cloud to host multiple single levels of security domains. The separation kernel hypervisor may be integrated within a COS such as, but not limited to, "Apache Cloud Stack" or any other similar system of cloud management software to allow a single cloud environment to setup multiple separate VWPs operating in a single domain of security, all running on a single set of computing, network, and storage hardware as shown. This is all made practical by the availability of SKH technology and KMS technology that can manage multiple encryption keys and other security objects needed to secure the network, storage, and other encryption needed for MSLS environments.

Figure 2:
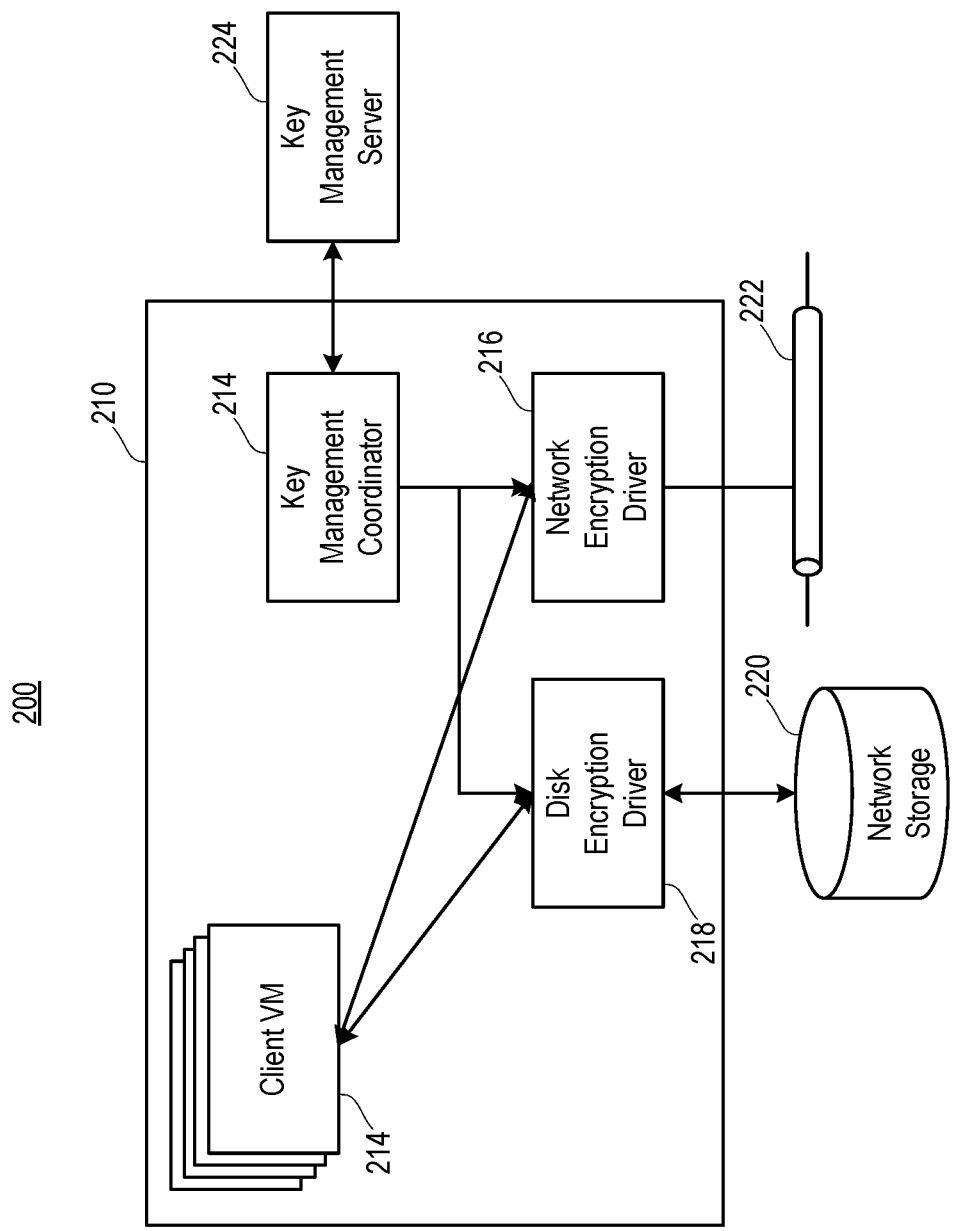
FIG. 2 is a diagram illustrating a VWP architecture for a single domain according to some examples.

FIG. 2 is a diagram illustrating a VWP architecture 200 for a single domain according to some examples. Referring to FIGS. 1-2, The MSLS cloud approach implements multiple VWPs (each of which may be a VWP 210) to build its MSLS environment. The VWP 210 includes one or more client VMs 214, a key management coordinator (or client) 214, a disk encryption driver 218, and a network encryption driver 216. The key management coordinator 214 connects to the KMS 224 and serves as an interface between the KMS 224 and the VWP 210. The disk encryption driver 218 encrypts content which is being stored to a disk (e.g., a network storage 220). The content may be encrypted and may include, for example, VM images and data drives. The network encryption driver 216 encrypts content being sent over a network 222 via suitable protocols such as but not limited to, Internet Protocol Security and IPSec.

A separation kernel is an OS that has only several tens of thousands of lines of code, no APIs, no interrupts and no input/output ports. Essentially, a separation kernel presents no attack surfaces. Any vulnerability that may exist in the separation kernel can be assessed, eliminated, or at least mitigated. The separation kernel is configured at installation time. Resources including memory addressing can be set up at that point. Such approach subdivides a computer's hardware physically using the CPU's built-in hardware virtualization capabilities to partition the hardware into separate physical subjects.

Adding a hypervisor means that the hardware can be virtualized to run (execute in) multiple different OSes or applications. Some examples described herein are based on the separation kernel being a real-time OS in which a scheduler is fully programmable.

A COS can provide the means to manage computing, storage, and network components of the cloud. The COS can use algorithms that dynamically determine when and how much of resources each cloud or each cloud application needs. Examples of the resources include but are not limited to, processing resources, network resources, storage resources, other peripheral computing resources. As a COS assesses the dynamically-changing resource needs of the applications that the COS supports, the COS automatically allocates or de-allocates resources in an elastic fashion. Traditionally, these systems only support the concept of issuing and managing resources within a single level of security (i.e., a single domain or a single partition) using VMs within that single domain.

A COS allocates computing, network, and storage resources using a component called a hypervisor or virtual machine monitor. Most traditional COSs and associated hypervisors are built atop of Microsoft Windows or Linux which have the vulnerabilities discussed earlier.

Figure 4:
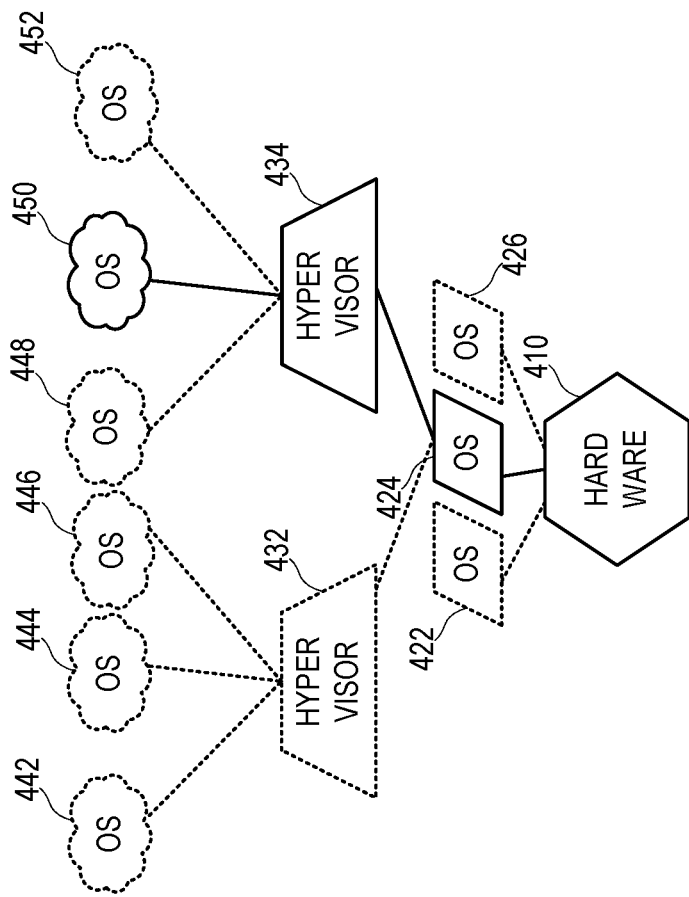
FIG. 4 is a diagram illustrating a Type 2 hypervisor according to some examples.
Figure 3:
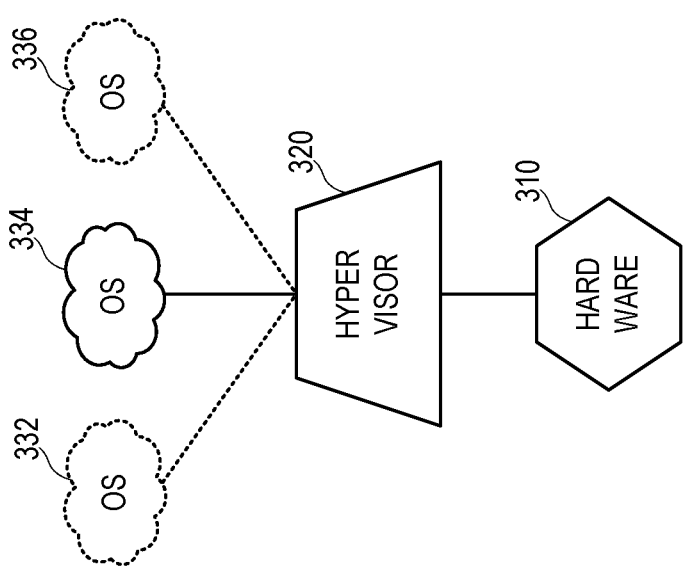
FIG. 3 is a diagram illustrating a Type 1 hypervisor according to some examples.

Most hypervisors are classified either Type 1 or Type 2 as shown in FIGS. 3 and 4, respectively. An example of a Type 1 hypervisor (e.g., a hypervisor 320) is shown in FIG. 3. The hypervisor 320 is installed natively (directly) on computer hardware 310. The hypervisor 320 can allocate resources for OSes 332, 334, and 336. The hypervisor 320 can be built on an implementation of OSes (e.g., Microsoft Windows and Linux). Examples of the implantation include but are not limited to, HyperV, Xen, KVM, and VMWare/ESXi. Intel x86 Xeon, Atom and Core i5, i7 families of processors use virtualization of drivers (Vt-D) and virtualization of memory (Vt-X). Such capabilities along with hyper-threading and multiple processor cores allow a single CPU to support many VMs running OSes.

Examples of a Type 2 hypervisor (e.g., hypervisors 432 and 434) are shown in FIG. 4. Hardware 410 may support one or more OSes 422-426. At least one of the OSes 422-426 (e.g., the OS 424) may execute at least one hypervisors (e.g., hypervisors 432 and 434). The hypervisors 432 and 434 can provision OSes 442-452. Thus, the hypervisors 432 and 434 may need an underlying OS (e.g., the OS 424) to be installed first such that the hypervisors 432 and 434 run like any other computer application.

The present disclosure relate to modifying a COS such that instead of using a hypervisor built on an OS, a secure kernel hypervisor approach is used to deliver VMs. The disclosed implementations do not simply allocate a VM. Rather, a VWP is delivered within a target single domain. This approach is enabled using encryption with a supporting enterprise KMS. KMS can be implemented in high volume environments in which hundreds or thousands of VWPs are being managed along with underlying virtual networking and storage encryption needs. The KMS allow management of day-to-day encryption key management needs in a highly secure, rapid manner with appropriate policy, documentation, logging and individual security.

In some arrangements, the COS (such as but not limited to, Apache Cloud Stack) is modified so that routines which normally provision VMs can provision VWP slots instead. Then within a given VWP, one or more VMs or specialty applications can be implemented.

Figure 5:
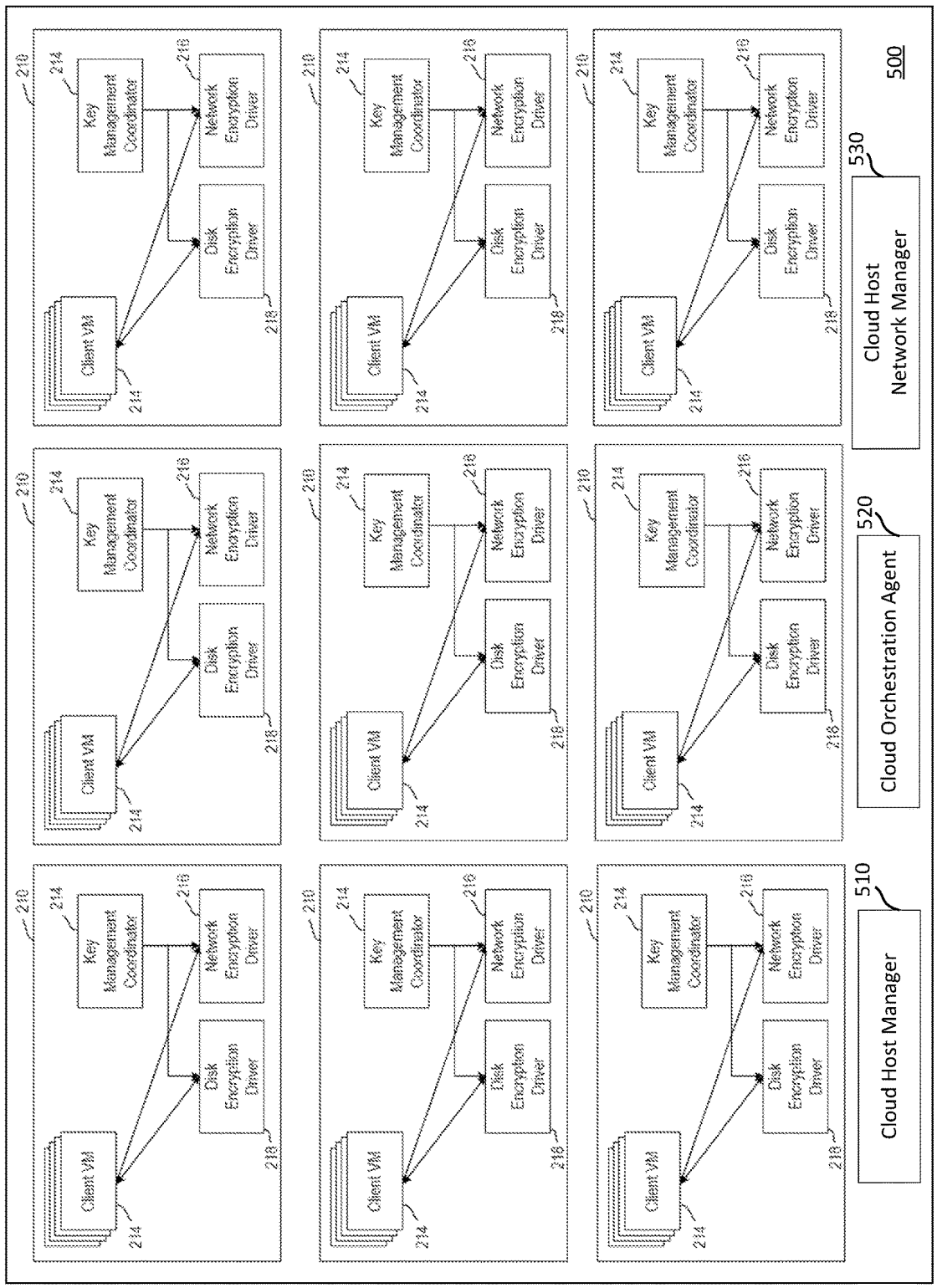
FIG. 5 is a diagram illustrating a cloud (separation kernel) host according to some examples.

In that regard, FIG. 5 is a diagram illustrating a cloud (separation kernel) host 500 according to some examples. Referring to FIGS. 1-5, a COS can coordinate with a cloud host manager (CHM) 510, a cloud orchestration agent (COA) 520, and a cloud host network manager (CHNM) 530 to allocate resources. The COS can configure the cloud host 500 to provision slots for VWPs 210 instead of regular VMs. One of the strengths associated with the disclosed implementations is that the provisioning of the multiple VWPs is performed using a single stack of hardware rather than separate stacks of hardware for each target domain.

Figure 6:
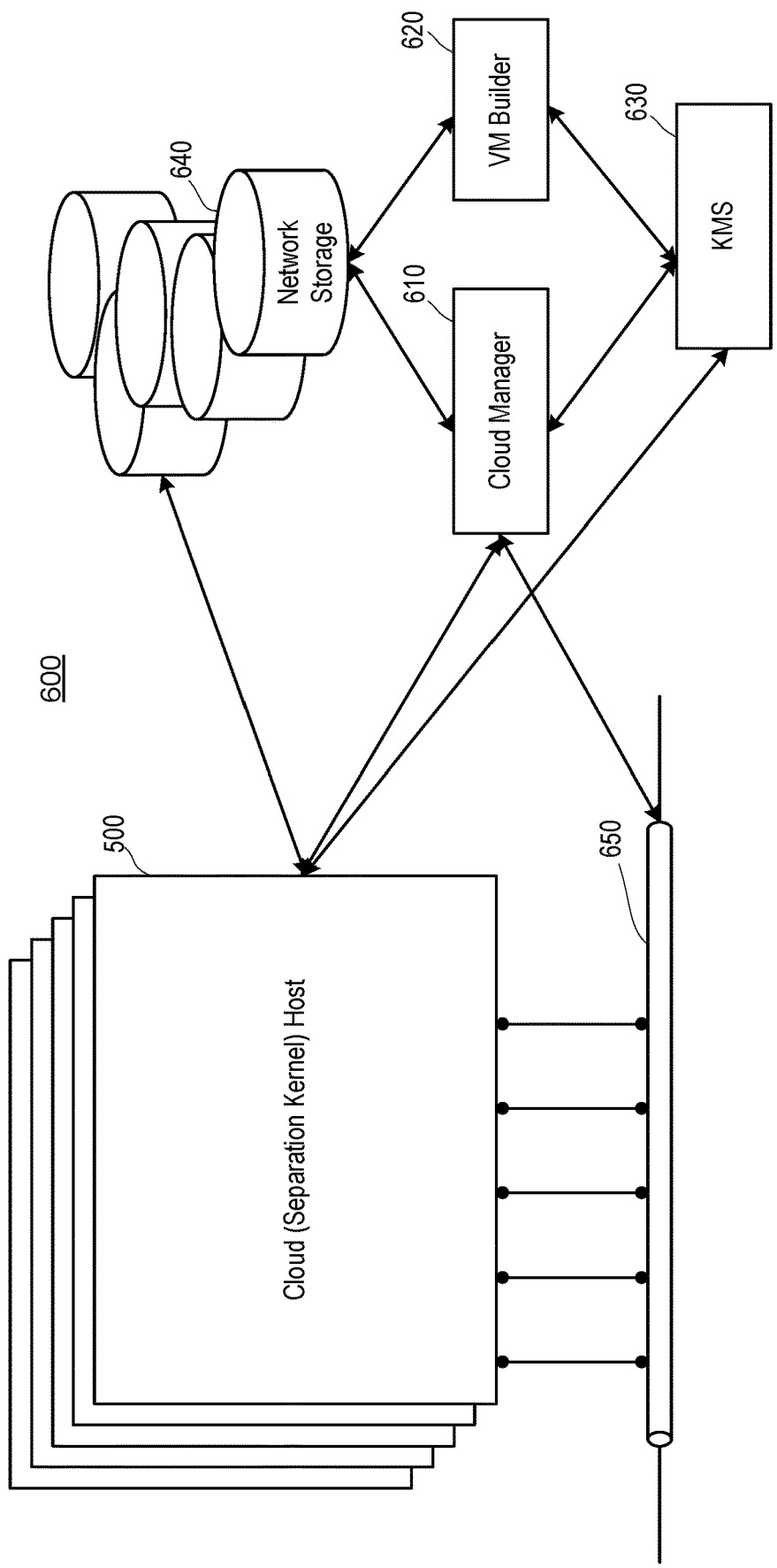
FIG. 6 is a diagram illustrating a multi-domain cloud according to some examples.

FIG. 6 is a diagram illustrating a multi-domain cloud 600 according to some examples. Referring to FIGS. 1-6, the multi-domain cloud 600 may be supported by a single stack of computer hardware inclusive of computing, networking, and storage resources. The multi-domain cloud 600 includes a plurality of cloud hosts 500 and associated network storages 640. All storage objects from the cloud hosts 500 may be encrypted. The cloud hosts 500 may be connected to a SDN. All network traffic may be encrypted via a suitable security protocol such as IPSec. Each physical hardware device may deploy multiple VWPs per host. A VM Builder (VMB) 620 may be software module used to allocate slots on a given hardware host. For instance, the VMB 620 can provision of CPU, GPU, network, and storage resources for the VMs supported by the VWPs of the cloud hosts 500. A modified COS such as Cloud Stack uses the VMB and a COA, among other supporting software modules, to allocate such resources.

As described herein, a VWP is generated using a SKH and encryption. Responsive to the VWP being generated, a series of encryption keys are retrieved from a KMS 630 to enable the newly generated VWP. Once enabled, the VWP can take on a "personality," which means VMs can be allocated to the VWP. The VMs can run specific OSes or specialty applications within each VWP. To destroy a VWP, the COS (e.g., a cloud manager 610) can revoke resources allocated to that VWP and affiliated encryption keys. The VWP is thus rendered inoperable. The resources of the destroyed VWP may then be re-allocated to a new VWP by the COS. As such, the cloud hosts 500, the cloud manager 610, and the VM builder 620 may be operatively coupled to the KMS 630 for accessing encryption objects. The cloud manager 610 and the VM builder 620 may be operatively coupled to the network storage 640 to access storage objects stored therein. The cloud manager 610 may be operatively coupled to each of the cloud hosts 500 to creating, managing, and destroying the cloud hosts.

Figure 7:
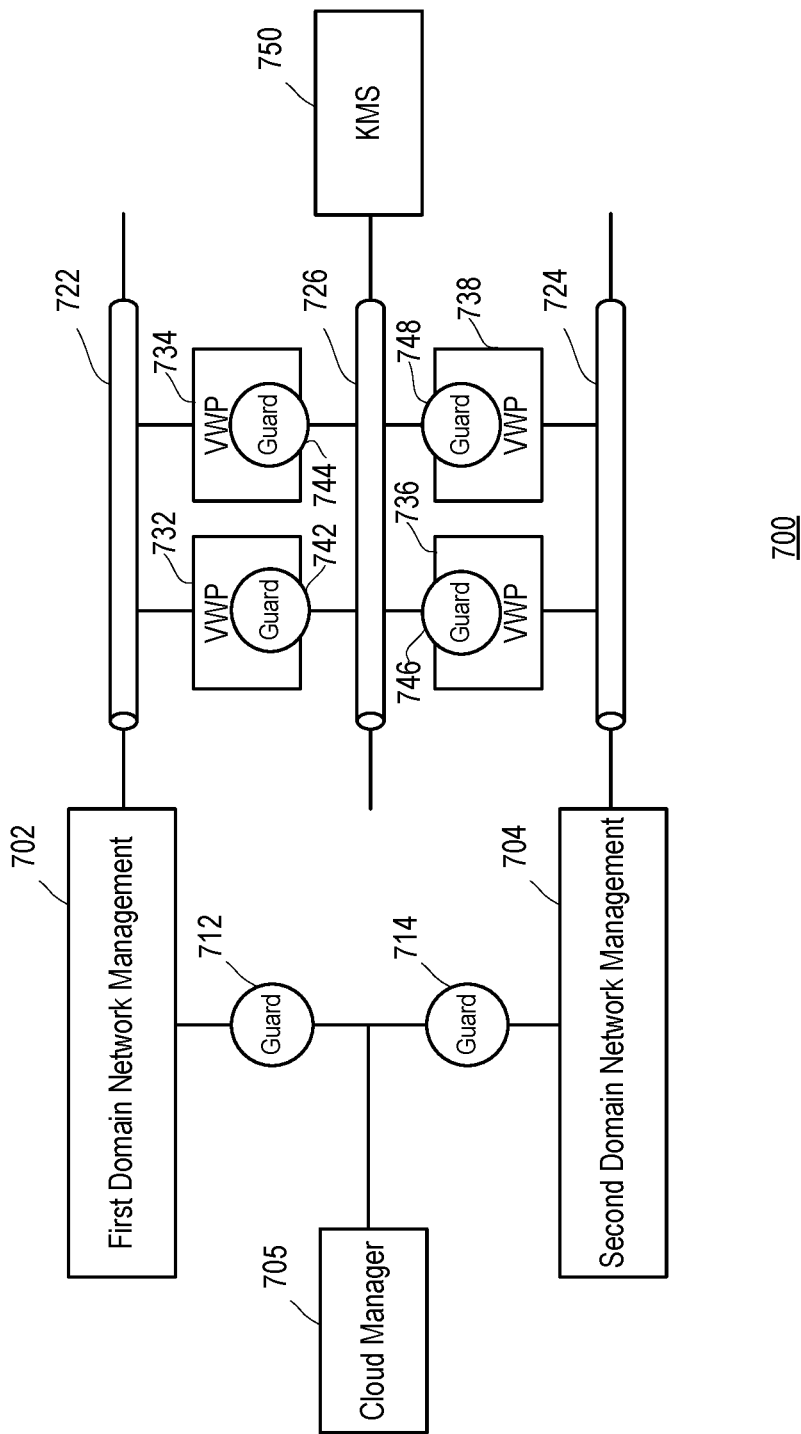
FIG. 7 is a diagram illustrating an inter-domain network traffic via a guard according to some examples.

FIG. 7 is a diagram illustrating an inter-domain networking scheme 700 via a guard according to some examples. Referring to FIGS. 1-7, secure networking is a key element of ensuring secure communications among separated domains in a MSLS multi-domain cloud networking environment. In some examples, encryption and key management systems ensure that all intra-domain network traffic is encrypted with a unique key. Networks within a single cloud are separated using Virtual Private Networking (VPN) capabilities based on IPSec security protocols. To allow predetermined network traffic (if any is allowed at all) between domains (e.g., inter-domain communications), one or more guards can be deployed as part of a trusted computing base (TCB). A guard may only allow traffic to pass through if correct credentials and encryption keys are present to allow decrypt, filtering, and encrypting of inter-domain network traffic.

For example, a first domain network management module 702 may manage networking (e.g., domain name system (DNS), dynamic host configuration protocol (DHCP), IP routing, and the like) for a first domain. A second domain network management module 704 may manage networking for a second domain. The domain network management modules 702 and 704 may be operatively coupled to each other for exchanging suitable data. A guard 712 associated with the first domain network management module 702 may be used to allow traffic from the first domain network management module 702 to pass through if correct credentials and encryption keys are present. A guard 714 associated with the second domain network management module 704 may be used to allow traffic from the second domain network management module 704 to pass through if correct credentials and encryption keys are present. A cloud manager 705 may be operatively coupled to a communication path after checks by the guards 712 and 714 are performed.

In some implementations, the first domain network management module 702 may manage communications for VWPs 732 and 734. In that regard, the first domain network management module 702 may be connected to a first network 722 for communicating with the VWPs 732 and 734. The first network 722 may be an intra-domain network. In some implementations, the second domain network management module 704 may manage communications for VWPs 736 and 738. In that regard, the second domain network management module 704 may be connected to a second network 724 for communicating with the VWPs 736 and 738. The second network 724 may be an intra-domain network.

The VWPs 732 and 736 may communicate with one another via a third network 726, which may be an inter-domain network. A guard 742 included in or otherwise associated with the VWP 732 may be used to allow traffic from the VWP 732 to pass through if correct credentials and encryption keys are present. A guard 746 included in or otherwise associated with the VWP 736 may be used to allow traffic from the VWP 736 to pass through if correct credentials and encryption keys are present. The VWPs 734 and 738 may communicate with one another via the third network 726. A guard 744 included in or otherwise associated with the VWP 734 may be used to allow traffic from the VWP 734 to pass through if correct credentials and encryption keys are present. A guard 748 included in or otherwise associated with the VWP 738 may be used to allow traffic from the VWP 738 to pass through if correct credentials and encryption keys are present. A KMS 750 may be operatively coupled to the third network 726 for providing encryption objects to the VWPs 732-738.

The process of issuing a VWP is part of the multi-domain cloud trust path. A trust agent is responsible for managing the VWP issuing process. Building a multi-domain capability within a cloud may need accreditation via an independent, recognized third party that validates an ability of the multi-domain cloud to appropriately segregate information that must be isolated from cross-domain access (e.g., transitioning from a secret to a top secret government networks). The software components or modules perform such isolation features within the multi-domain cloud trust path may be part of the TCB. To reduce complexity and simplify the accreditation process, the number of separate components that must be part of the TCB may be minimized.

Figure 8:
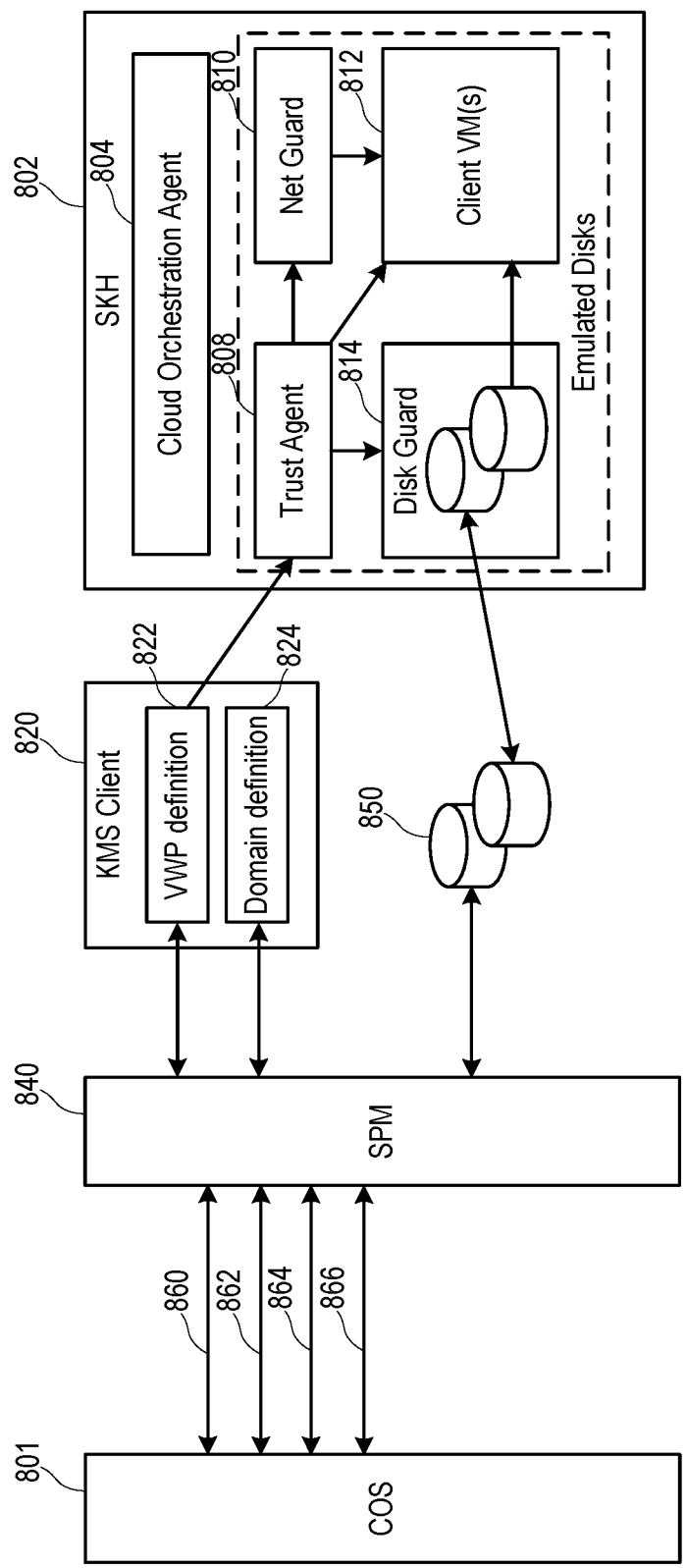
FIG. 8 is a diagram illustrating a multi-domain cloud trust path according to some examples.

FIG. 8 is a diagram illustrating a multi-domain cloud trust path 800 according to some examples. Referring to FIGS. 1-8, the multi-domain cloud trust path 800 illustrates an example process by which a COS 801 manages generation of a VWP. The multi-domain cloud trust path 800 involves components such as but not limited to, the COS 801, a SKH 802, a KMS client 820, a security policy manager (SPM) 840, and a storage database 850. The COS 801, at least a portion of the SKH 802, the KMS client 820, and the storage database 850 are associated with a management domain. The SPM 840, a trust agent 808, a net guard 810, and a disk guard 814 are associated with the TCB. The VM data and objects stored in the storage database 850 and client VM(s) 812 are associated with a client domain.

In some arrangements, the SPM 840 can interface with the COS 801 for a process that includes, at 860, initializing a VWP. At 862, the SPM 840 and the COS 801 can identify a domain identifier (ID) and create a domain label. At 864, the SPM 840 and the COS 801 can request blank disk storage and other relevant parameters. At 866, the SPM 840 and the COS 801 can generate the VWP, which includes a boot root device.

In some arrangements, the SPM 840 can interface with the KMS via the KMS client 820 in order to obtain appropriate encryption keys for the VWP and domain definition associated with the VWP. In that regard, the KMS client 820 stores VWP definition 822 and domain definition 824. The VWP definition 822 and domain definition 824 may be encrypted when stored at the KMS client 820. The SPM 840 can interface with the storage database 850 to setup an encrypted storage disk storing data and objects corresponding to the client VM(s) 812. The COS 801 can interface with a cloud orchestration agent 804 via the SKH 802 to create an encryption trust agent (e.g., the trust agent 808), a network guard (e.g., the net guard 810) and a disk guard (e.g., the disk guard 814). Once the components 808, 810, and 814 are created, one or more client VMs 812 can be created, making use of the net guard 810 and disk guard 814.

Figure 9:
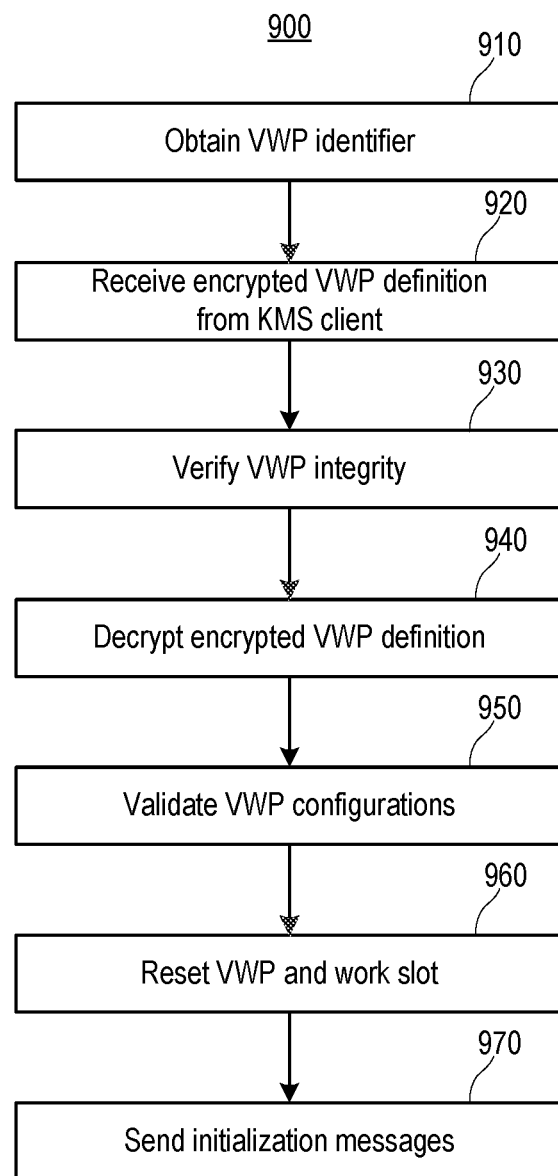
FIG. 9 is a diagram illustrating a multi-domain trust agent VWP creation process according to some examples.

FIG. 9 is a diagram illustrating a method 900 for creating a multi-domain trust agent VWP according to some examples. Referring to FIGS. 1-9, the method 900 corresponds to the multi-domain cloud trust path 800. In some arrangements, the method 900 can be implemented by at least the trust agent 808, which facilitates generation and delivery a VWP.

At 910, the method 900 begins with obtaining a VWP identifier (e.g., WP(ID), VWP ID, W_ID, and the like) that identifies the VWP in any suitable manner. In one example, the VWP identifier can be assigned by and received from the COS 801. At 920, the trust agent 808 receives the encrypted VWP definition 822, for example, by obtaining an encryption key from the KMS client 820.

At 930, the trust agent 808 verifies the integrity of the VWP. In some implementations, the trust agent 808 can verify a signature of the VWP via a suitable trusted computing module (TPM). At 940, the trust agent 808 may decrypt the encrypted VWP definition 822 using a master key. The master key may be received from the TPM. In some implementations, the trust agent 808 may extract a network domain key, a disk encryption key, and boot instructions/definition from the decrypted VWP definition 822. At 950, the trust agent 808 validate that the configurations associated with the VWP and the configurations associated with work slot of the SKH 802 are compatible.

At 960, the trust agent 808 can reset the VWP and the work slot. For example, the trust agent 808 can trigger resetting and clearing data held by the net guard 810, the disk guard 814, and the client VM(s) 812. The trust agent 808 can trigger initialization of all resources associated with the SKH 802. At 970, the trust agent 808 can send initialization messages. For example, the trust agent 808 can send the network domain key to the net guard 810. The trust agent 808 can send the disk encryption key to the disk guard 814. Further, the trust agent 808 can send the boot instructions/definitions to the client VM(s) 812 to start booting the client VM(s) 812. The net guard 810 can send emulated network interface card (NIC) to the client VM(s) 812.

In some examples, a SKH, a KMS, and a COS are used to implement the configurations described herein. Other configurations of the multi-domain cloud presented as a multi-tenant cloud with MSLS can be implemented.

Various acronyms used throughout can be found in Table 1, below.

Acronyms

TABLE 1

| Acronym | Definition |
| --- | --- |
| API | Application Program Interface |
| ARM | Advanced RISC Machine |
| CHM | Cloud Host Manager |
| CHNM | Cloud Host Network Manager |
| COA | Cloud Orchestration Agent |
| COS | Cloud Orchestration System |
| CPU | Central processing Unit |
| GPU | Graphics Processing Unit |
| HIPAA | Health Insurance Portability and Accountability Act |
| IPSEC | Internet Protocol Security |
| KMS | Key Management System |
| KOA | Key Orchestration Appliance ™ |
| MILS | Multiple Independent Levels of Safety and Security |
| MSLS | Multiple Single Levels of Security |
| SKH | Secure Kernel Hypervisor |
| SPM | Security Policy Manager |
| TCB | Trusted Computing Base |
| TPM | Trusted Computing Module |
| VPN | Virtual Private Networking |
| VWP | Virtual Work Package |

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present disclosure. Various modifications to these examples will be readily apparent to those skilled in the art, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A security system for Multiple Single Level Security (MSLS) domains, comprising one or more processors and one or more memory devices configured to implement:
    a Secure Kernel Hypervisor (SKH), wherein the SKH configures a single multi-tenant cloud to host the MSLS domains;
    a Cloud Orchestration System (COS), wherein the COS configures the single multi-tenant cloud to set up a plurality of separate Virtual Work Packages (VWPs) for the MSLS domains, each of the plurality of separate VWPs is generated using at least the SKH; and
    a Key Management System (KMS), wherein the KMS is configured to manage security objects associated with the MSLS domains, the security objects comprise encryption keys, wherein each of the plurality of separate VWPs comprises:
        one or more virtual machines;
        a disk encryption driver that encrypts first content that is being stored to a disk; and
            a network encryption driver that encrypts second content that is being sent over a network.
2. The security system of claim 1, wherein the SKH comprises a separation kernel and a hypervisor.
3. The security system of claim 2, wherein the separation kernel is a kernel that has no API, no interrupts, and no input/output ports.
4. The security system of claim 2, wherein the separation kernel is configured at installation without capabilities to change installed configurations after installation.

5. The security system of claim 2, wherein the hypervisor configures the single multi-tenant cloud to host the MSLS domains by virtualizing the hardware of the single multi-tenant cloud to execute a plurality of different operating systems or applications, where each of the plurality of different operating systems or applications corresponds to one of the MSLS domains.
6. The security system of claim 1, wherein the COS dynamically allocates or de-allocates resources for the MSLS domains, wherein the resources comprise one or more of processing resources, network resources, storage resources, peripherals of the single multi-tenant cloud.
7. The security system of claim 1, wherein the COS assigns VWP slots, the VWP slots correspond to the plurality of separate VWPs.
8. The security system of claim 7, wherein each of the VWP slots supports one or more virtual machines or specialty applications.
9. The security system of claim 1, wherein the KMS manages the security objects associated with the MSLS domains by determining the security objects in response to a VWP being created.
10. The security system of claim 1, wherein the COS is further configured to destroy a VWP by revoking resources assigned to the VWP and security objects associated with the VWP.
11. The security system of claim 1, wherein the KMS encrypts each intra-domain network traffic with a unique security object.
12. A method, comprising:
    configuring a single multi-tenant cloud to host Multiple Single Level Security (MSLS) domains using a Secure Kernel Hypervisor (SKH);
    configuring the single multi-tenant cloud to set up a plurality of separate Virtual Work Packages (VWPs) for the MSLS domains, each of the plurality of separate VWPs is generated using at least the SKH; and
    managing security objects associated with the MSLS domains, the security objects comprise encryption keys, wherein each of the plurality of separate VWPs comprises:
        one or more virtual machines;
        a disk encryption driver that encrypts first content that is being stored to a disk; and
        a network encryption driver that encrypts second content that is being sent over a network.
13. The method of claim 12, wherein configuring the single multi-tenant cloud to set up the plurality of separate VWPs for the MSLS domains comprises dynamically allocating or de-allocating resources for the MSLS domains, wherein the resources comprise one or more of processing resources, network resources, storage resources, peripherals of the single multi-tenant cloud.
14. The method of claim 12, wherein configuring the single multi-tenant cloud to set up the plurality of separate VWPs for the MSLS domains comprises assigning VWP slots, the VWP slots correspond to the plurality of separate VWPs.
15. The method of claim 14, wherein each of the VWP slots supports one or more virtual machines or specialty applications.
16. The method of claim 12, wherein managing the security objects associated with the MSLS domains comprises determining the security objects in response to a VWP being created.
17. The method of claim 12, wherein configuring the single multi-tenant cloud to set up the plurality of separate VWPs for the MSLS domains comprises destroying a VWP by revoking resources assigned to the VWP and security objects associated with the VWP.

18. A security system for Multiple Single Level Security (MSLS) domains, comprising:
- one or more processors and one or more memory devices;
- means for configuring a single multi-tenant cloud to host the MSLS domains using a Secure Kernel Hypervisor (SKH);
- means for configuring the single multi-tenant cloud to set up a plurality of separate Virtual Work Packages (VWPs) for the MSLS domains, each of the plurality of separate VWPs is generated using at least the SKH; and
- means for managing security objects associated with the MSLS domains, the security objects comprise encryption keys, wherein each of the plurality of separate VWPs comprises:
- one or more virtual machines;
- a disk encryption driver that encrypts first content that is being stored to a disk; and
- a network encryption driver that encrypts second content that is being sent over a network.

19. A non-transitory processor-readable medium comprising processor-readable instructions such that, when executed, causes one or more processors to:
- configure a single multi-tenant cloud to host Multiple Single Level Security (MSLS) domains using a Secure Kernel Hypervisor (SKH);
- configure the single multi-tenant cloud to set up a plurality of separate Virtual Work Packages (VWPs) for the MSLS domains, each of the plurality of separate VWPs is generated using at least the SKH; and
- manage security objects associated with the MSLS domains, the security objects comprise encryption keys, wherein each of the plurality of separate VWPs comprises:
- one or more virtual machines;
- a disk encryption driver that encrypts first content that is being stored to a disk; and
- a network encryption driver that encrypts second content that is being sent over a network.

\* \* \* \* \*